(12) United States Patent
Yahashi et al.

(10) Patent No.: US 8,678,023 B2
(45) Date of Patent: Mar. 25, 2014

(54) DAMAGE DETECTION SYSTEM AND VEHICLE

(75) Inventors: Hiroki Yahashi, Toyota (JP); Tsukuo Ishitoya, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 30 days.

(21) Appl. No.: 13/577,966

(22) PCT Filed: Sep. 3, 2010

(86) PCT No.: PCT/JP2010/065101
§ 371 (c)(1),
(2), (4) Date: Aug. 9, 2012

(87) PCT Pub. No.: WO2012/029166
PCT Pub. Date: Mar. 8, 2012

(65) Prior Publication Data
US 2012/0305107 A1   Dec. 6, 2012

(51) Int. Cl.
*F16K 17/14* (2006.01)

(52) U.S. Cl.
USPC ..... 137/67; 251/69; 251/129.01; 251/129.15; 123/529; 200/61.08

(58) Field of Classification Search
USPC ........... 137/67, 68.11, 68.16; 251/69, 129.01, 251/129.04, 129.15; 123/529; 200/61.08
See application file for complete search history.

(56) References Cited

U.S. PATENT DOCUMENTS

| | | | | |
|---|---|---|---|---|
| 2,223,097 A | * | 11/1940 | Ehret | 200/61.5 |
| 2,783,320 A | * | 2/1957 | Fink | 200/61.08 |
| 3,751,613 A | * | 8/1973 | Inose et al. | 200/61.08 |
| 3,905,015 A | * | 9/1975 | Inose et al. | 180/274 |
| 4,012,613 A | * | 3/1977 | Watson | 200/61.08 |
| 5,156,180 A | * | 10/1992 | Sturgis | 137/79 |
| 5,197,710 A | * | 3/1993 | Wass et al. | 251/129.15 |
| 5,452,738 A | * | 9/1995 | Borland et al. | 137/265 |
| 6,557,821 B2 | * | 5/2003 | Girouard et al. | 251/30.03 |
| 6,777,947 B2 | * | 8/2004 | McCoy et al. | 324/449 |
| 7,337,798 B2 | * | 3/2008 | Inoue | 137/38 |
| 2009/0165867 A1 | * | 7/2009 | Andreas | 137/68.11 |

FOREIGN PATENT DOCUMENTS

| | | |
|---|---|---|
| CN | 1846094 A | 10/2006 |
| EP | 2 166 272 A1 | 3/2010 |
| JP | 10-030797 A | 2/1998 |
| JP | 2005-069454 A | 3/2005 |
| JP | 2009-115322 A | 5/2009 |
| WO | 2007/124784 A1 | 11/2007 |

OTHER PUBLICATIONS

International Search Report mailed Oct. 26, 2010 of PCT/JP2010/065101.

* cited by examiner

*Primary Examiner* — John Rivell
*Assistant Examiner* — Matthew W Jellett
(74) *Attorney, Agent, or Firm* — Kenyon & Kenyon LLP (57) ABSTRACT

A damage detection system includes an electromagnetic valve that is provided at a first end of a pressure vessel and operated by supplied electric power, a harness that is disposed so as to at least partially extend along at least a part of a bottom surface of the pressure vessel and that serves to supply electric power to the electromagnetic valve, and a damage detector for detecting damage of the pressure vessel based on an input of a pressing force from the bottom surface side of the pressure vessel.

4 Claims, 7 Drawing Sheets

DAMAGE DETECTION SYSTEM AND VEHICLE

This is a 371 national phase application of PCT/JP2010/065101 filed 3 Sep. 2010, the contents of which are incorporated herein by reference.

TECHNICAL FIELD

The present invention relates to a damage detection system and a vehicle, and more particularly to a damage detection system for detecting damage in a pressure vessel capable of compressing and accumulating fluid, and to a vehicle mounted with such a pressure vessel.

BACKGROUND ART

Pressure vessels such as a high-pressure tank, in which a substance such as natural gas or hydrogen gas that is in gas form under normal temperatures and pressures is compressed to a high pressure and the compressed substance is filled, are generally known. A vehicle such as a natural gas automobile or a fuel cell automobile is equipped with a pressure vessel in which natural gas or hydrogen gas serving as the fuel is pressurized, filled, and accumulated. It is generally desired that a pressure vessel mounted on a vehicle have a lighter weight for improving fuel efficiency and the like. For this reason, pressure vessels made of fiber reinforced plastics (FRP) such as carbon fiber reinforced plastic (CFRP) and glass fiber reinforced plastic (GFRP) are employed favorably.

JP 2005-069454 A discloses causing a harness to be damaged prior to a gas conduit being damaged so as to cut off electric conduction to a solenoid, thereby closing an electromagnetic valve provided at an end of a hydrogen gas tank, so as to prevent a gas leak that may otherwise occur at the time of a vehicle crash.

Conventionally, when mounting a pressure vessel on a vehicle, the vessel has been mounted at a location such as a rear portion or a central portion of the vehicle, which is relatively less susceptible to shocks and other external influences. However, recently, improvements have been made in pressure resistance of pressure vessels in response to the necessity to increase the fill amount per unit volume, and consequently shock resistance is also improved. Considering this aspect and also considering the desire to reserve riding space or loading space, there are cases in which it is preferred to mount the pressure vessel at a lower portion or a bottom portion of the vehicle, depending on the shape and the application of the vehicle.

When the pressure vessel is mounted at a lower portion or a bottom portion of the vehicle, no inconveniences arise during normal traveling. However, when the vehicle travels on a very bumpy road such as an unpaved road, or when the vehicle passes over an obstacle such as a rock, the road surface or the obstacle may interfere with the lower or bottom portion of the vehicle, and the portion interfered with may become damaged. In such a case, when the pressure vessel becomes damaged to a degree exceeding an acceptable level, it is necessary to immediately detect the damage and/or prevent fluid leakage from the pressure vessel.

PRIOR ART LITERATURE

Patent Literature

Patent Literature 1: JP 2005-069454 A

SUMMARY OF THE INVENTION

Problems Addressed by the Invention

According to the technique disclosed in the above-noted Patent Literature 1, even when the pressure vessel such as the hydrogen gas tank becomes damaged due to a shock from underneath caused by interference with the road surface or the like, if no electric failure or damage is generated in the electromagnetic valve or the harness, power would be supplied and the valve would remain open, such that there are risks of hydrogen gas leakage from the pressure vessel. Further, even in a case where it is possible to avoid hydrogen gas leakage, when the electromagnetic valve is to be opened and gas is to be re-filled, sufficient compression may not be possible due to leakage from the damaged hydrogen gas tank, which would disable filling to a desired amount.

An object of the present invention is to detect or predict, by means of a simple structure, damage of the pressure vessel caused by a shock due to interference or the like from the underside of the pressure vessel.

Means for Solving the Problems

A damage detection system according to the present invention includes an electromagnetic valve that is provided at a first end of a pressure vessel and operated by supplied electric power, a harness that is disposed so as to at least partially extend along at least a part of a bottom surface of the pressure vessel and serves to supply electric power to the electromagnetic valve, and a damage detector for detecting damage of the pressure vessel based on an input of a pressing force from the bottom surface side of the pressure vessel.

A vehicle according to the present invention includes an electromagnetic valve that is provided at a first end of a pressure vessel and operated by supplied electric power, a harness that is disposed so as to at least partially extend along at least a part of a bottom surface of the pressure vessel and serves to supply electric power to the electromagnetic valve, and a damage detector for detecting damage of the pressure vessel based on an input of a pressing force from the bottom surface side of the pressure vessel.

EMBODIMENTS OF THE INVENTION

Figure 1:
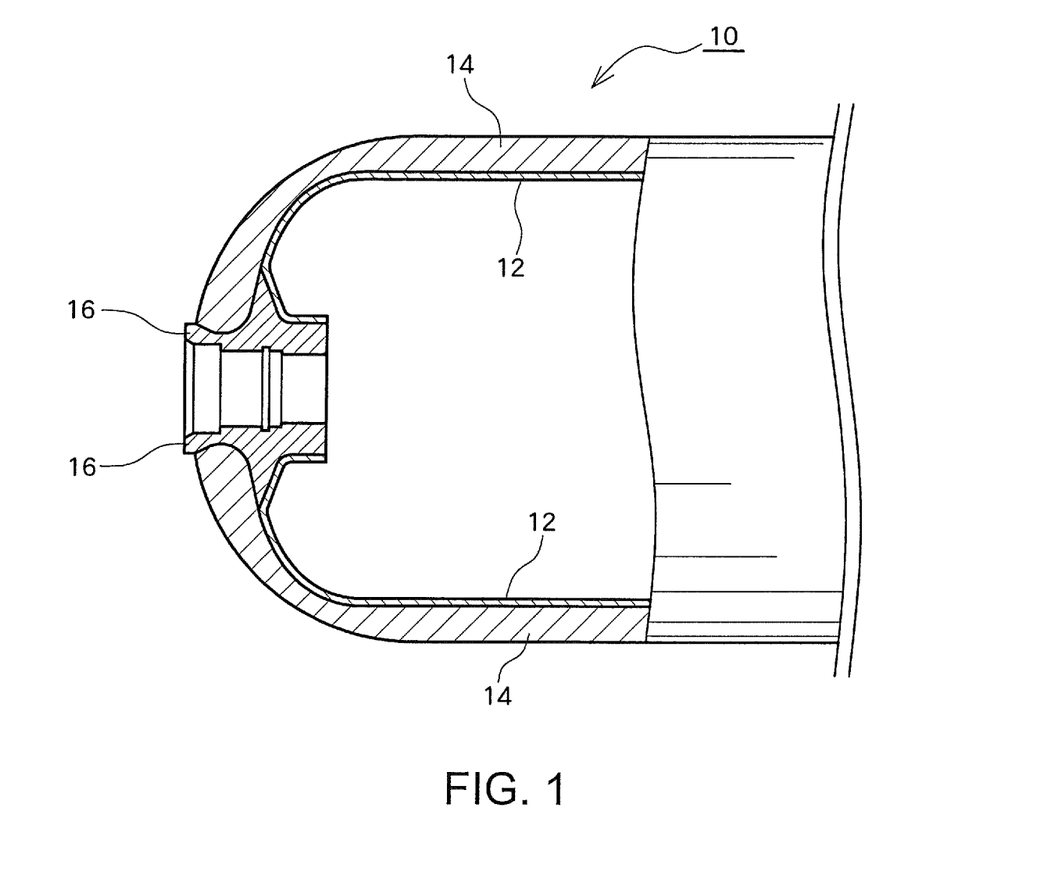
FIG. 1 is a partial cross-sectional view schematically showing a structure of a pressure vessel.

Below, embodiments of the present invention are described in detail by reference to the drawings. First, the structure of a pressure vessel is explained. The pressure vessel 10 shown as an example in FIG. 1 is composed of a hollow-shaped liner 12, and a fiber reinforced plastic layer (FRP layer) 14 that covers the peripheral portion of the liner 12. At an end of the pressure vessel 10, at least one pipe sleeve 16 is provided. The pipe sleeve 16 is configured to be connectable to a valve (not shown), and, by means of opening and closing operations of this valve, flow of a high-pressure fluid into and out of the pressure vessel 10 can be controlled. The liner 12 may, for example, be composed of a thermoplastic resin having a high gas barrier property, which may be a nylon resin such as 6-nylon or 6,6-nylon, or a polypropylene resin, and to which elastomer may be added as necessary.

The fiber reinforced plastic layer 14 can generally be formed by first impregnating a fiber bundle (filaments) obtained by bundling a plurality of long and continuous string-like fibers which may include glass fibers, carbon fibers, Kevlar fibers, and the like, with a resin liquid including a thermosetting resin such as epoxy resin or polyester resin, then drying and/or semi-setting as necessary to obtain pre-impregnated fibers, winding the pre-impregnated fibers on the peripheral surface of the liner 12, and subsequently curing the resin liquid. At that time, in addition to adjusting the material and/or thickness of the liner 12, by, for example, adjusting the fibers constituting the fiber reinforced plastic layer 14, the volume of the fiber bundle, the number of windings of the pre-impregnated fibers, and the like so as to adjust the thickness of fiber reinforced plastic layer 14, desired pressure resistance, shock resistance, and other design strength parameters of the pressure vessel 10 can be achieved.

Figure 2A:
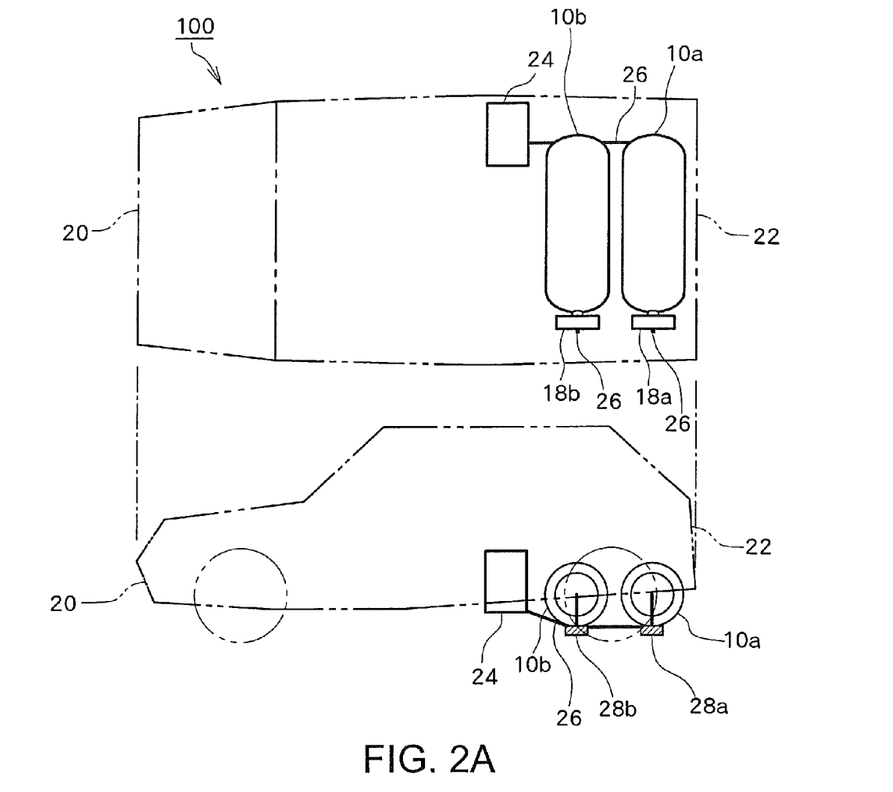
FIG. 2A is a diagram for schematically explaining a structure of a vehicle provided with a pressure vessel according to an embodiment of the present invention.

FIG. 2A shows an example vehicle 100 according to an embodiment of the present invention, on which pressure vessels 10a, 10b corresponding to the pressure vessel 10 shown in FIG. 1 are mounted. In FIG. 2A, the upper drawing is a top view of the vehicle 100, while the lower drawing is a left side view of the vehicle 100.

In FIG. 2A, the pressure vessels 10a, 10b are located toward the rear face 22 of the vehicle 100 in parallel to each other, in a manner such that their lengthwise direction is oriented toward the side faces of the vehicle 100 and parallel to the horizontal plane. Meanwhile, a power source 24 is located more toward the front face 20 as compared to the pressure vessels 10a, 10b. At one end of the respective pressure vessels 10a, 10b in the lengthwise direction, or more specifically, at the portions corresponding to the opening of the pipe sleeve 16 in the example pressure vessel 10 shown in FIG. 1, there are provided electromagnetic valves 18a, 18b that open and close in response to presence and absence of electric current. Further, at the bottom portions of the pressure vessels 10a, 10b, damage detectors 28a, 28b are provided respectively for detecting damage to the pressure vessels 10a, 10b from the underside which may occur as a result of interference with the road surface.

According to an embodiment of the present invention, the power source 24 may be configured in any manner, so long as it can serve as a power supply source capable of supplying electric power to the electromagnetic valves 18a, 18b. The power source 24 may, for example be, but is not limited to, a secondary battery or a capacitor. Further, the electromagnetic valves 18a, 18b may respectively be configured to operate by the effect of integrated solenoids, to open by electric conduction and to close by termination of electric conduction, so as to enable control of fluid flow into and out of the pressure vessels 10a, 10b.

Figure 2B:
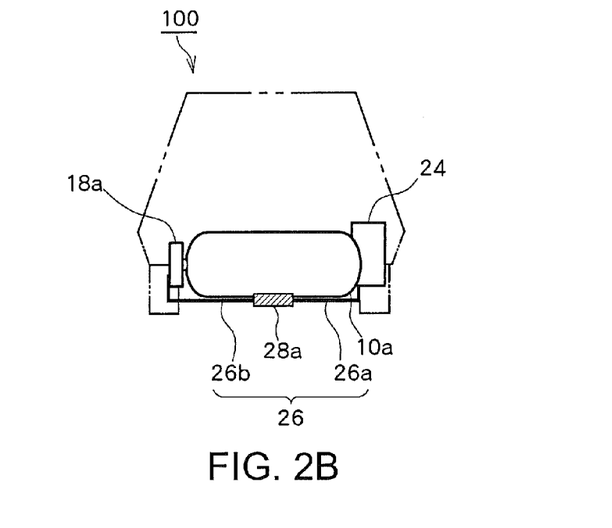
FIG. 2B is a diagram for schematically explaining a structure of a vehicle provided with a pressure vessel according to the embodiment of the present invention.

FIG. 2B shows a rear face view taken from the rear face 22 side of the vehicle 100 shown in FIG. 2A. At least a part of a harness 26 including one or more wiring lines for electrically connecting between the power source 24 and the electromagnetic valve 18a is disposed extending along at least a part of the bottom portion of the pressure vessel 10a. The harness 26 is configured to include a power source side harness 26a and an electromagnetic valve side harness 26b, which are connected to each other via the damage detector 28a at an approximately central part of the bottom portion of the pressure vessel 10a. Although FIG. 2B only illustrates the arrangement of the pressure vessel 10a located at the back of the vehicle 100 and its proximal components, the pressure vessel 10b and its proximal components can also be disposed in an arrangement similar to that of the pressure vessel 10a and its proximal components. In general, the harness 26 on the pressure vessel 10a side and the harness 26 on the pressure vessel 10b side are arranged in parallel with respect to the power source 24. While the power source side harness 26a may be partially shared by the pressure vessel 10a side and the pressure vessel 10b side, the power source side harness 26a may alternatively be provided independently for the respective sides.

In the vehicle 100 shown in FIGS. 2A and 2B, in order to arrange the harness 26 to adequately extend at the bottom portion of the pressure vessels 10a, 10b, the power source 24 is located on a side opposite that of the electromagnetic valves 18a, 18b, with the central portions of the pressure vessels 10a, 10b located therebetween. In the example shown, the power source 24 is located on the right side of the vehicle 100, while the electromagnetic valves 18a, 18b are located on the left side of the vehicle 100. The arrangement of the power source 24 and the electromagnetic valves 18a, 18b is not limited to that shown in the drawings. For example, an arrangement is also possible in which the power source 24 is located on the left side of the vehicle 100 and the electromagnetic valves 18a, 18b are located on the right side of the vehicle 100.

Figure 3:
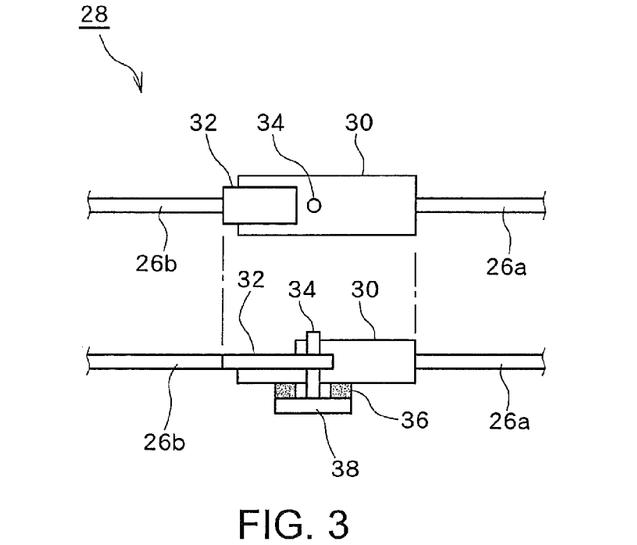
FIG. 3 is a diagram for explaining how damage detection is performed in a vehicle provided with a pressure vessel according to the embodiment of the present invention.

FIG. 3 is a diagram schematically showing an example structure of the damage detection device 28 that can be provided as the damage detector 28a or 28b at the bottom portion of the pressure vessel 10a or 10b in the vehicle 100 shown in FIGS. 2A and 2B. In FIG. 3, the upper drawing corresponds to a top view of the damage detection device 28, while the lower drawing corresponds to a rear view taken from the rear face 22 side of the vehicle 100 on which this damage detection device 28 is disposed.

In FIG. 3, a tip portion of an electromagnetic valve side connector 32 provided at an end of the electromagnetic valve side harness 26b is inserted into a power source side connector 30 provided at an end of the power source side harness 26a, thereby being configured to achieve electrical connection. By inserting a pin 34 into a hole penetrating the power source side connector 30 and the electromagnetic valve side connector 32 in an approximately orthogonal direction, the power source side connector 30 and the electromagnetic valve side connector 32, which are electrically connected to each other, are fixed so that at ordinary times the connection does not fail easily. The pin 34 contacts a pressing force receiver 38 provided underneath, and the pressing force receiver 38 is adhered or fastened to the power source side connector 30 via a fragile layer 36. In the embodiment, the pin 34 and the pressing force receiver 38 may or may not be fixed to each other, so long as they are at least arranged in contact with each other. In order to prevent the pin 34 from accidentally falling out from the upper side of the damage detection device 28, the pin 34 may be provided with an appropriate shape and/or structure as necessary so that, for example, the pin 34 does not come out of the upper side of the power source side connector 30.

In the damage detection device 28 shown in FIG. 3, when an excessive pressing force is applied from below the pressing force receiver 38, the pin 34 is once urged upward, and simultaneously the fragile layer 36 deforms and at least a part thereof breaks and/or falls off. In other words, this fragile layer 36 corresponds to a "deforming part." When the fragile layer 36 breaks and/or falls off, the pressing force receiver 38 falls off from the power source side connector 30, and further, the pin 34 also falls off upon loss of support by the pressing force receiver 38. When the pin 34 falls off, the electrical connection between the power source side connector 30 and the electromagnetic valve side connector 32 fails, resulting in termination of the electrical connection between the power source 24 side and the electromagnetic valve 18a, 18b side. By fixing the damage detection device 28 having the above-described configuration to the bottom portion of the pressure vessel using an appropriate method such as adhesion, damage due to a pressing force applied from under the pressure vessel can be easily detected.

Figure 4:
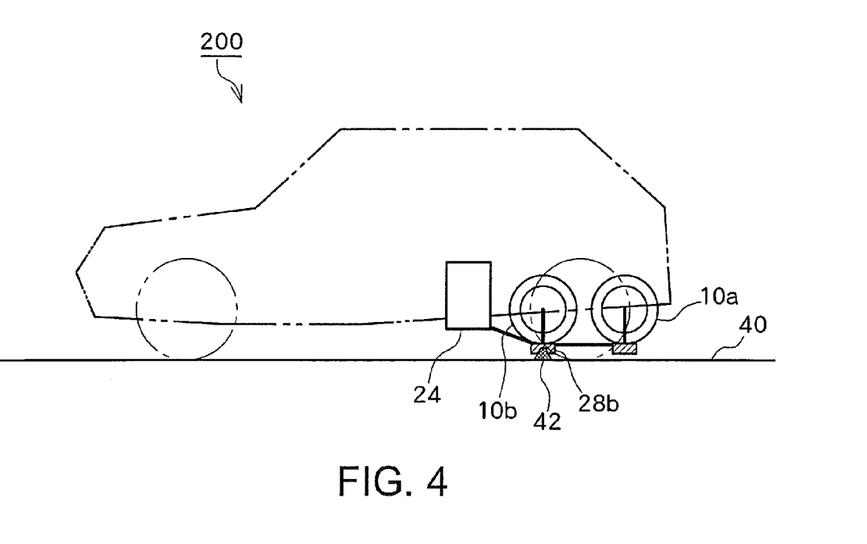
FIG. 4 is a diagram for schematically explaining a structure of a damage detection device according to the embodiment of the present invention.

Specifically, as shown in FIG. 4, for example, when traveling over an obstacle 42 on a road surface 40, the damage detector 28b disposed at the bottom portion of the pressure vessel 10b detects or predicts damage of the pressure vessel 10b, and terminates the electrical connection between the power source 24 and the pressure vessel 10b. According to the present embodiment, even when, for example, the pressure vessel receives damage that is slight to a degree that the damage cannot be visually confirmed, the supply of electric power from the power source side to the electromagnetic valves can be stopped compulsorily. Accordingly, leakage of fluid from the pressure vessel to the outside can be prevented effectively. Further, even when, for example, a reboot is attempted after the stop, since electric conduction from the power source to the electromagnetic valves is disabled, it is possible to prevent supply of a high-pressure fluid into the pressure vessel by mistake.

According to the present embodiment, the pin 34 may be configured in any manner so long as it can be inserted into the hole in the power source side connector 30 and the electromagnetic valve side connector 32 to thereby fix the power source side connector 30 and the electromagnetic valve side connector 32 to each other. For example, as the pin 34, a pin having a diameter of approximately 1 to 2 mm and composed of stainless steel, aluminum, aluminum alloy, or the like can be employed favorably, but the pin 34 is not limited thereto.

According to the present embodiment, the fragile layer 36 may be configured in any manner so long as it can adhere or fasten the power source side connector 30 and the pressing force receiver 38 to each other. For example, while a resin formed to have a thickness of approximately 1 to 2 mm can be employed favorably, the fragile layer 36 is not limited thereto and may be selected as appropriate in accordance with desired physical strength and the shape of the pressing force receiver 38.

According to the present embodiment, in order to appropriately transmit the pressing force received by the pressing force receiver 38 to the pin 34 and the fragile layer 36, it is preferred that the pressing force receiver 38 has the properties of high rigidity and low resilience. For example, stainless steel, low alloy steel, and the like can be used favorably, but the pressing force receiver 38 is not limited thereto.

Figure 5A:
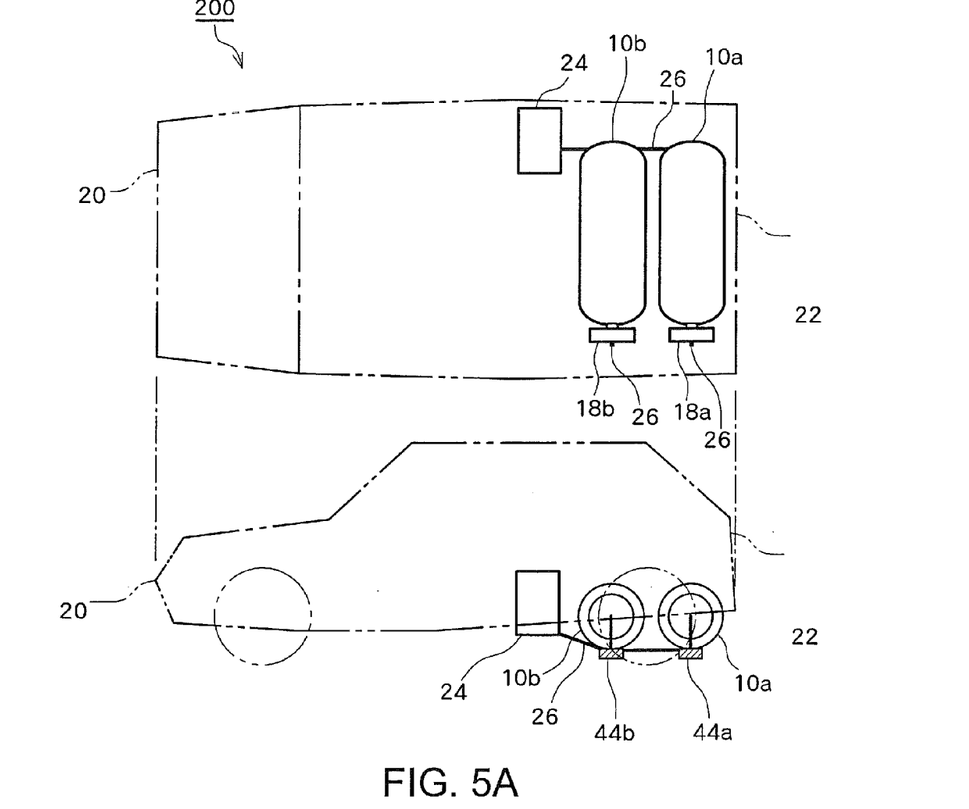
FIG. 5A is a diagram for schematically explaining a structure of a vehicle provided with a pressure vessel according to another embodiment of the present invention.

FIG. 5A shows a vehicle 200 according to another embodiment of the present invention mounted with pressure vessels 10a, 10b corresponding to the pressure vessel 10 shown in FIG. 1. In FIG. 5A, the upper drawing is a top view of the vehicle 200, while the lower drawing is a left side view of the vehicle 200. The vehicle 200 shown in FIG. 5A is substantially identical in structure with the vehicle 100 shown in FIG. 2A, except that the damage detectors 28a, 28b are replaced with damage detectors 44a, 44b respectively.

Figure 5B:
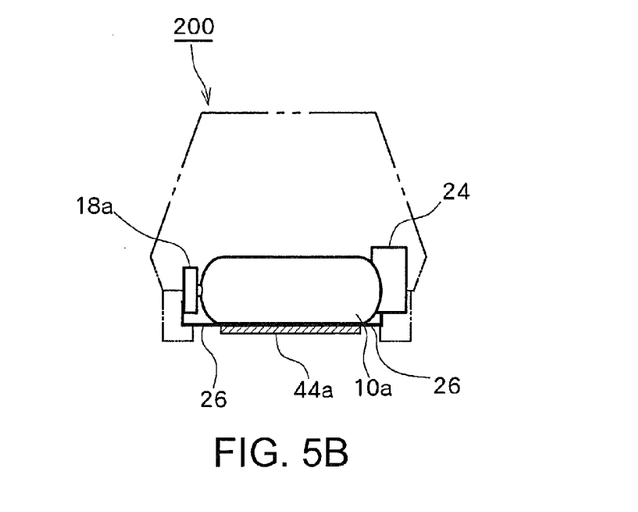
FIG. 5B is a diagram for schematically explaining a structure of the vehicle provided with the pressure vessel according to the other embodiment of the present invention.

FIG. 5B shows a rear face view taken from the rear face 22 side of the vehicle 200 shown in FIG. 5A. At least a part of the harness 26 including one or more wiring lines for electrically connecting between the power source 24 and the electromagnetic valve 18a is disposed extending along at least a part of the bottom portion of the pressure vessel 10a. Further, the damage detector 44a is arranged so as to almost entirely cover the harness 26 located at the bottom portion of the pressure vessel 10a. Similar to the case of FIG. 2B, although FIG. 5B illustrates only the arrangement of the pressure vessel 10a located at the back of the vehicle 200 and its proximal components, the pressure vessel 10b and its proximal components can also be disposed in an arrangement similar to that of the pressure vessel 10a and its proximal components.

Figure 6A:
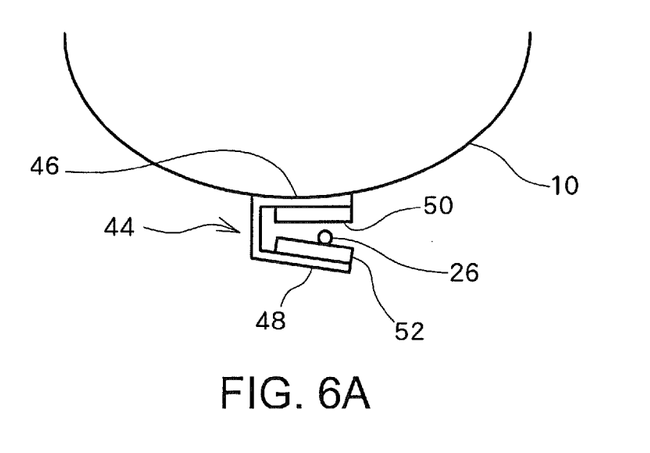
FIG. 6A is a diagram for explaining an example operation of a damage detection device according to the other embodiment of the present invention.

FIG. 6A is a diagram schematically showing an example structure of a damage detection device 44 that can be provided as the damage detector 44a or 44b at the bottom portion of the pressure vessel 10a or 10b in the vehicle 200 shown in FIGS. 5A and 5B.

FIG. 6A corresponds to a side view of the vehicle 200 taken from the left side. The damage detection device 44 shown in FIG. 6A includes, on its outer side, a fixed part 46 that is fixed to the bottom portion of the pressure vessel 10 by adhesion or other appropriate methods, and a pressing force receiver 48 that receives a pressing force from below the pressure vessel 10. Further, on the inner side of the damage detection device 44, an upper blade 50 and a lower blade 52 having projecting tips are provided, and the harness 26 is arranged between those blades.

In the damage detection device 44 shown in FIG. 6A, when an excessive pressing force is applied from below the pressing force receiver 48, the damage detection device 44 deforms so that the lower blade 52 is pushed upward together with the pressing force receiver 48. As a result, the space for accommodating the harness 26 between the upper blade 50 and the lower blade 52 is eliminated, and the pushed-up lower blade 52 portion cuts the harness 26, thereby disconnecting the wiring line (refer to FIG. 6B). In other words, this damage detection device 44, or more specifically, the lower blade 52 that is pushed upward together with the pressing force receiver 48, corresponds to a "deforming part." By adhering or fixing the damage detection device 44 having the above-described configuration to the bottom portion of the pressure vessel, damage due to a pressing force applied from under the pressure vessel can be easily detected.

Figure 7:
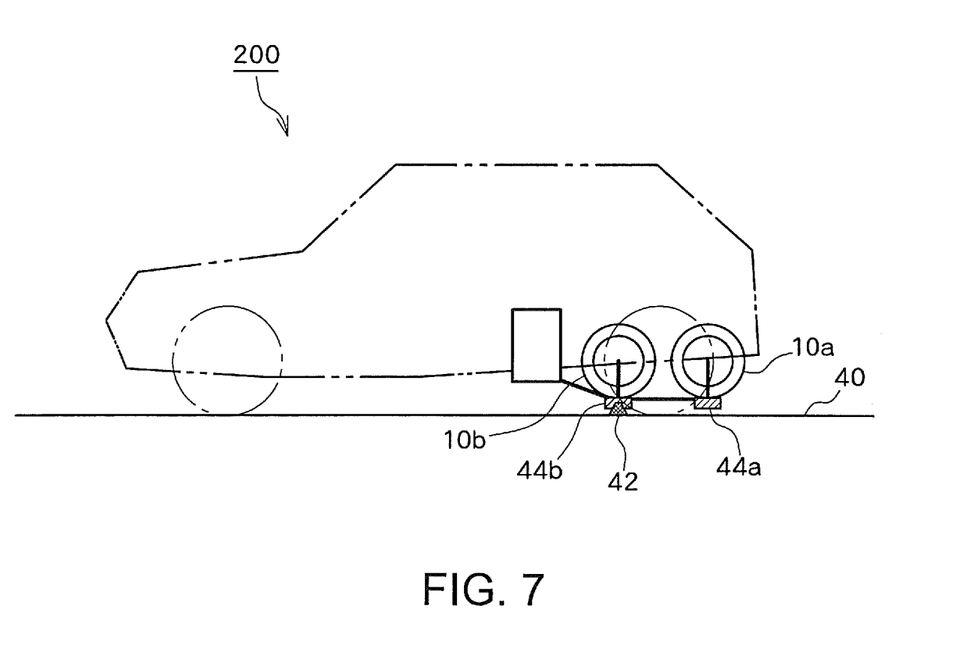
FIG. 7 is a diagram for explaining how damage detection is performed in the vehicle provided with the pressure vessel according to the other embodiment of the present invention.

More specifically, as shown in FIG. 7 for example, when traveling over an obstacle 42 on a road surface 40, the damage detector 44b disposed at the bottom portion of the pressure vessel 10b detects or predicts damage of the pressure vessel 10b, and terminates the electrical connection between the power source 24 and the pressure vessel 10b. According to the present embodiment, even when, for example, the pressure vessel receives damage that is slight to a degree that the damage cannot be visually confirmed, the supply of electric power from the power source side to the electromagnetic valves can be stopped compulsorily. Accordingly, leakage of fluid from the pressure vessel to the outside can be prevented effectively. Further, even when, for example, a reboot is attempted after the stop, since electric conduction from the power source to the electromagnetic valves is disabled, it is also possible to prevent supply of a high-pressure fluid into the pressure vessel by mistake.

Figure 6B:
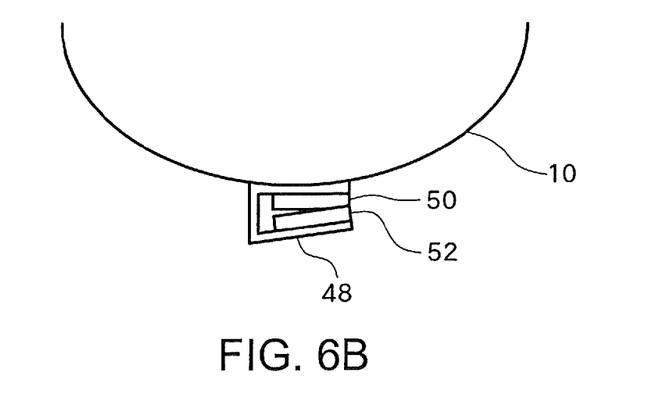
FIG. 6B is a diagram for explaining an example operation of the damage detection device according to the other embodiment of the present invention.
Figure 6C:
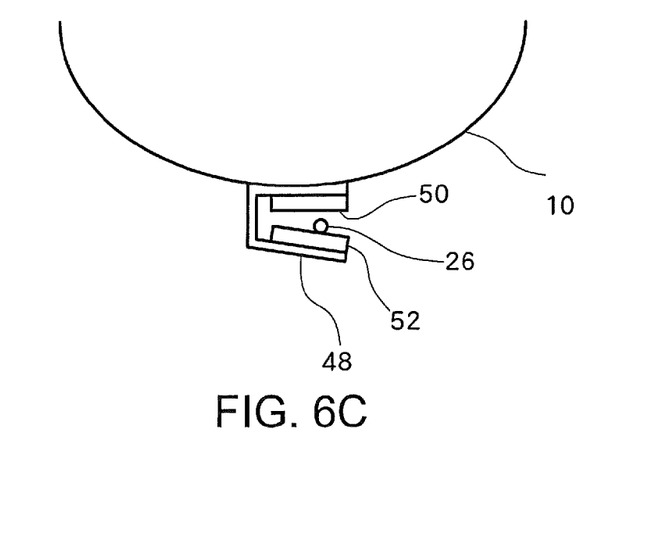
FIG. 6C is a diagram for explaining an example operation of the damage detection device according to the other embodiment of the present invention.

According to the present embodiment, if the shape of the damage detection device 44 is maintained in the state as shown in FIG. 6B, for example, which is the state when the upper blade 50 and the lower blade 52 cut the harness, electric conduction may occur between the cut-off harness and the damage detection device 44, which may possibly cause improper operation of the electromagnetic valve or electrical leakage. Accordingly, it is preferred to provide the pressing force receiver 48 with a spring characteristic so that it restores its original position as shown in FIG. 6C when the obstacle or interfering element that pressed the pressing force receiver 48 from underneath is removed or eliminated. Further, in a further embodiment, it is also preferred to coat the outer portions of the damage detection device 44 with an insulating member such as synthetic resin (for example, polyester or polyurethane).

Figure 8A:
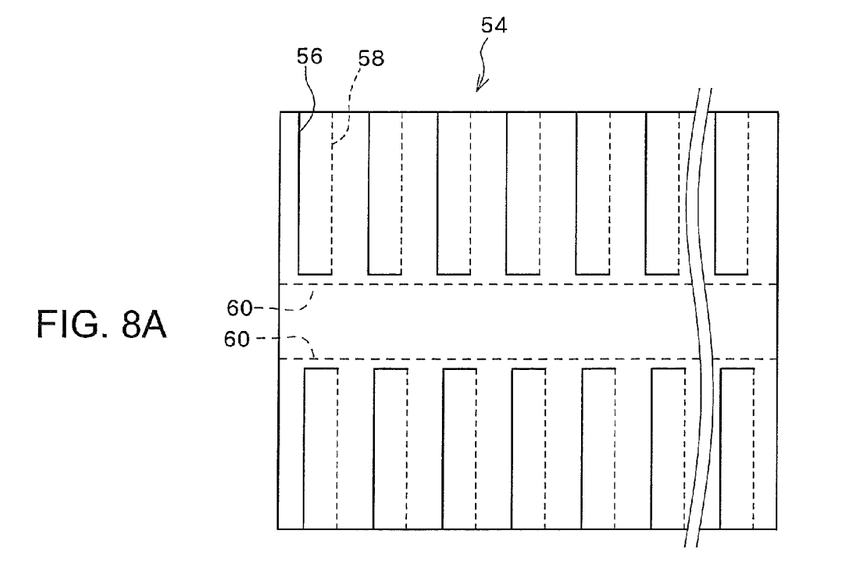
FIG. 8A is a diagram for explaining an example material used in producing the damage detection device according to the other embodiment of the present invention.

Next, an example method of producing the damage detection device 44 according to an embodiment of the present invention is described. The present embodiment provides a method of producing the damage detection device 44 using a metal flat plate 54 as shown in FIG. 8A, for example. As the flat plate 54 shown in FIG. 8A, stainless steel, carbon steel or other steel, low alloy metal steel, or the like formed to have a thickness of approximately 1 to 2 mm can be employed favorably. However, the flat plate 54 is not limited thereto, and may be selected as appropriate in accordance with the size and strength of the harness 26.

As shown in FIG. 8A, the portions of the flat plate 54 indicated by solid lines 56 are cut. Next, the portions indicated by dashed lines 58 are bent approximately perpendicularly toward the viewer of the drawing. These bent portions constitute the upper blades 50a, 50b, 50c, . . . 50z and the lower blades 52a, 52b, 52c, . . . 52z. Finally, by bending the portions indicated by long dashed lines 60 toward the viewer of the drawing, the damage detection device 44 as shown in FIG. 8B can be produced.

Figure 8B:
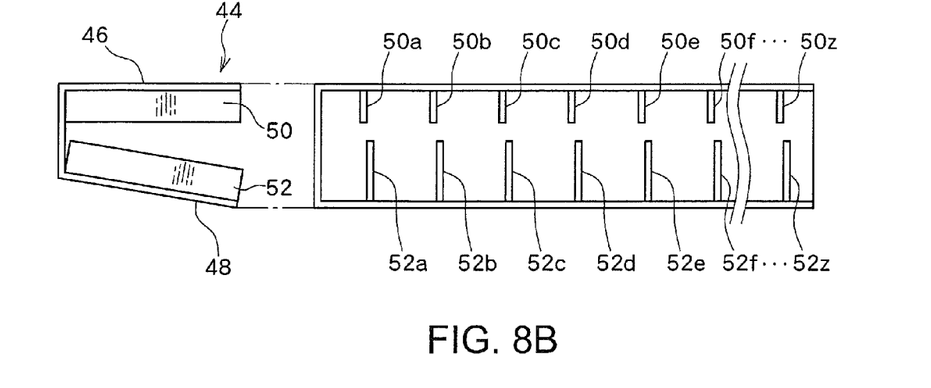
FIG. 8B is a diagram for schematically explaining a structure of the produced damage detection device.

According to the damage detection device 44 having the configuration as shown, for example, in FIG. 8B, the tips of the upper blade 50 and lower blade 52 are shifted out of phase with each other by an amount corresponding to the thickness of the blade, which is the thickness of the flat plate 54 used as the material, so that, by a sliding movement of the side surfaces of the upper blade 50 and lower blade 52 against each other, the harness 26 can be cut or broken to disconnect the internal wiring line. As another embodiment, it is also possible to machine the tips of the upper blade 50 and lower blade 52 to have sharp edges, and the blade edges aligned in phase with each other may be used to cut the harness 26 and disconnect the internal wiring line. Further, the intervals between the upper blades 50a, 50b, 50c, . . . 50z, the intervals between the lower blades 52a, 52b, 52c, . . . 52z, and the interval between the fixed part 46 and the pressing force receiver 48 may respectively be selected as appropriate in accordance with the size and strength of the harness 26.

A damage detection system according to an embodiment of the present invention can be applied, for example, to a configuration which, due to an arrangement including a pressure vessel being mounted on a vehicle at its lower portion or bottom portion, may receive damage caused by an input of pressing force from the bottom surface side of the pressure vessel. Although the pressure vessel is not limited to those made of FRP and may, for example, be made of steel, the pressure vessel is preferably made of FRP when being mounted on a vehicle. Further, the fluid to be filled in the pressure vessel is not limited to natural gas or hydrogen, and may, for example, be nitrogen or oxygen.

A vehicle according to an embodiment of the present invention may include any type of vehicle such as a motorcycle, bicycle, train, and the like, so long as a pressure vessel can be mounted at a lower portion or bottom portion of the vehicle. In particular, a vehicle according to the present invention can be applied favorably to automobiles such as a natural gas automobile and a fuel cell automobile in which, due to an arrangement of a pressure vessel, interference or the like may occur between a bottom part of the pressure vessel and a road surface.

REFERENCE NUMERALS 10, 10a, 10b pressure vessel; 12 liner; 14 fiber reinforced resin layer; 16 pipe sleeve; 18a, 18b electromagnetic valve; 20 front face; 22 rear face; 24 power source; 26 harness; 26a power source side harness; 26b electromagnetic valve side harness; 28, 44 damage detection device; 28a, 28b, 44a, 44b damage detector; 30 power source side connector; 32 electromagnetic valve side connector; 34 pin; 36 fragile layer; 38 pressing force receiver; 40 road surface; 42 obstacle; 46 fixed part; 48 pressing force receiver; 50 upper blade; 52 lower blade; 54 flat plate; 100, 200 vehicle.

The invention claimed is:

1. A damage detection system comprising:
an electromagnetic valve that is provided at a first end of a pressure vessel and operated by supplied electric power;
a harness that is disposed so as to at least partially extend along at least a part of a bottom surface of the pressure vessel and serves to supply electric power to the electromagnetic valve; and
a damage detector that detects damage of the pressure vessel based on an input of a pressing force from the bottom surface side of the pressure vessel, wherein
when the damage detector detects damage of the pressure vessel, the damage detector terminates electrical connection between the harness and the electromagnetic valve so that electric conduction to the electromagnetic valve is disabled.

2. The damage detection system according to claim 1, wherein the damage detector comprises:
a pressing force receiver that receives a pressing force from the bottom surface side of the pressure vessel; and
a deforming part that deforms in accordance with the pressing force received by the pressing force receiver, and thereby terminates electrical connection between the harness and the electromagnetic valve.

3. A vehicle comprising:
- an electromagnetic valve that is provided at a first end of a pressure vessel and operated by supplied electric power;
- a harness that is disposed so as to at least partially extend along at least a part of a bottom surface of the pressure vessel and serves to supply electric power to the electromagnetic valve; and
- a damage detector that detects damage of the pressure vessel based on an input of a pressing force from the bottom surface side of the pressure vessel, wherein
- when the damage detector detects damage of the pressure vessel, the damage detector terminates electrical connection between the harness and the electromagnetic valve so that electric conduction to the electromagnetic valve is disabled.

4. The vehicle according to claim 3, wherein the damage detector comprises:
- a pressing force receiver that receives a pressing force from the bottom surface side of the pressure vessel; and
- a deforming part that deforms in accordance with the pressing force received by the pressing force receiver, and thereby terminates electrical connection between the harness and the electromagnetic valve.

\* \* \* \* \*